United States Patent [19]
Simpson

[11] Patent Number: 5,179,550
[45] Date of Patent: Jan. 12, 1993

[54] SYSTEM AND METHOD FOR CONTROLLING A MULTI-POINT MATRIX SWITCH

[75] Inventor: William B. Simpson, Sunnyvale, Calif.

[73] Assignee: Loral Aerospace Corp., New York, N.Y.

[21] Appl. No.: 665,891

[22] Filed: Mar. 7, 1991

[51] Int. Cl.⁵ .......................................... H04G 11/04
[52] U.S. Cl. .................................. 370/54; 370/58.1; 370/65.5; 370/60; 340/700; 340/721; 340/825.55; 340/826; 379/247; 379/248
[58] Field of Search ................. 370/58.1, 58.2, 58.3, 370/60, 60.1, 66, 67, 54, 95.2, 85.8, 65.5; 340/700, 721, 825.08, 825.1, 825.11, 825.13, 825.54, 825.55, 826, 825.03; 379/247, 248

[56] References Cited

U.S. PATENT DOCUMENTS

| | | | |
|---|---|---|---|
| 4,220,823 | 9/1980 | Littlefield | 179/16 |
| 4,389,642 | 6/1983 | Kahn | 340/825.03 |
| 4,495,615 | 1/1985 | Wilcke | 370/58 |
| 4,797,875 | 1/1989 | Pospischil et al. | 370/92 |
| 4,905,233 | 2/1990 | Cain et al. | 370/94.1 |
| 4,953,159 | 8/1990 | Hayden et al. | 370/67 |
| 4,961,070 | 10/1990 | Maher et al. | 340/721 |

OTHER PUBLICATIONS

AFSCF Training, Manual, RTS DSM Operations, vol. 1, Course No. 255, (Preliminary) Jul. 1985.
AFSCF Training, Manual, RTS DSM Operations, vol. 2, Course No. 255, (Preliminary) Jul. 1985.

Primary Examiner—Douglas W. Olms
Assistant Examiner—Wellington Chin
Attorney, Agent, or Firm—Dennis S. Fernandez; Edward J. Radlo

[57] ABSTRACT

A system and method for controlling a multi-point matrix switch (13) to route signals in a communication system (11). The invention identifies source and destination ports (129, 133) in the communication system (11) and then polls identified ports (129, 133) to recognize those that are available for communication. Identified and recognized ports (129, 133) are displayed graphically, so that at least one path (139) between recognized source ports (129, 133) and associated recognized destination ports (129, 133) may be selected graphically by user (159) input. Selected path (139) information is then submitted to switch (13) to cause switch (13) to route signals through the selected paths (139) by connecting recognized source ports (129, 133) to associated recognized destination ports (129, 133).

21 Claims, 10 Drawing Sheets

| MATRIX Data Routing Group control: | | | Free RAM: 335592 | |
|---|---|---|---|---|
| ------ SOURCE ------ | | ------ DESTINATION ------ | | |
| 01:c SCFNHSA | 17: SCFNCF2 | 01:c MCC9 | 17: EX09 | |
| 02: SCFNHSB | 18: SCFTDSA | 02:c MCC7 | 18: EMCC | |
| 03: SCFVTSA | 19: SCFM22 | 03: MCC3 | 19: SCR | |
| 04:c SCFVTSB | 20: SCFCTSC | 04: MCC4 | 20: EX00 | |
| 05: SCFHTSA | 21: SCFTCSC | 05: MCC5 | 21: EX10 | |
| 06: SCFHTSB | 22: SCFADMF | 06: MCC6 | 22: EX11 | |
| 07: SCFGTSA | 23: SCFDGSC | 07: SDLC | 23: EX12 | |
| 08: SCFGTSB | 24: SCFEX03 | 08: SDLB | 24: UKCC | |
| 09: SCFTTSA | 25: SCFEX04 | 09: RCC | 25: EX13 | |
| 10: SCFTTSB | 26: SCFEX05 | 10: EX04 | 26: TRW | |
| 11: SCFIOSA | 27: SCFEX06 | 11: MC11 | 27: LAB | |
| 12: SCFTCSA | 28: SCFDMSP | 12: EX05 | 28: FOX | |
| 13: SCFRVCF | 29: SCFNDCA | 13: SDLD | 29: TL14 | |
| 14: SCFWSG | 30: SCFT041 | 14: EX06 | 30: BAKR | |
| 15: SCFEX01 | 31: | 15: EX07 | 31: | |
| 16: SCFNCF1 | 32: | 16: EX08 | 32: | |

Message: Select Source(s) and Destination(s)
UNCLASSIFIED

FIG. 4

```
MATRIX  Data Routing Group control:              Free RAM: 335592

|------- SOURCE -------|---- DRG PARAMS ----|------ DESTINATION ------|
01:c SCFNHSA      Active DRG ====:> 1      (1,2)         7:  EX09
02:  SCFNHSB      DRG 1 comm port ==  0    (0-5) (Top)   8:  EMCC
03:  SCFVTSA      DRG 2 comm port ==  3    (0-5) (Bottom) 9:  SCR
04:c SCFVTSB      DRG Timeout ====  200    (1-1000 msec) 0:  EX00
05:  SCFHTSA      In/Out Latency ==   0    (0-1000 msec) 1:  EX10
06:  SCFHTSB      Max Errors ====    90    (1-1000)      2:  EX11
07:  SCFGTSA      Retries =======     2    (1-10)        3:  EX12
08:  SCFGTSB      Clock Mode ====     C    (C)lk (B)ypass 4: UKCC
09:  SCFTTSA      Zone 3 Format ==    F    (F)ull (M)erged 5: EX13
10:  SCFTTSB                                              6:  TRW
11:  SCFIOSA      F1-Help       F2-Save/Leave   F3-Restore 7: LAB
12:  SCFTCSA      F4-Switch In  F5-Set Primary  F6-Self Test 8: FOX
13:  SCFRVCF                                              9:  TL14
14:  SCFWSG                                               0:  BAKR
15:  SCFEX01     31:                     15: EX07        31:
16:  SCFNCF1     32:                     16: EX08        32:

Message: Select Source(s) and Destination(s)
========================= UNCLASSIFIED =========================
```

FIG. 5

```
MATRIX  Data Routing Group control:                       Free RAM: 335592

------- SOURCE -------|------- DESTINATION -------
01:c SCFNHSA    17: SCFNCF2           01:c MCC9         17:         EX09
02:  SCFNHSB                                            18:         EMCC
03:  SCFVTSA       ┌─────── GLOBAL POLLING ────────┐    19:         SCR
04:c SCFVTSB       │                               │    20:         EX00
05:  SCFHTSA       │ Black Primary Command  =:>    │    21:         EX10
06:  SCFHTSB       │ Black Primary Status   =:(BPC)│    22:         EX11
                   │ Black Primary Status   =:(BPS)│
07:  SCFGTSA       │ Back-Up Command        =:(BUC)│    23:         EX12
08:  SCFGTSB       │ Back-Up Status         =:(BUS)│    24:         UKCC
09:  SCFTTSA       │ Black TeLemetry        =:(BTL)│    25:         EX13
10:  SCFTTSB       │ IriG B (system time)   =:(IGB)│    26:         TRW
11:  SCFIOSA       │ Log return responses =: N (Y/N)│   27:         LAB
12:  SCFTCSA       │                               │    28:         FOX
13:  SCFRVCF       │ F1-Help          F3-Leave     │    29:         TL14
                   │ (Enter) to execute Polling    │
14:  SCFWSG        └───────────────────────────────┘    30:         BAKR
                                ╲127
15:  SCFEX01                              14: EX06      31:
16:  SCFNCF1                              15: EX07      32:
                                          16: EX08

Message: Select Source(s) and Destination(s)
====================== UNCLASSIFIED ======================

FIG. 6
```

| MATRIX Data Routing Group control: | Free RAM: 343912 |
|---|---|

193↘

| ↓phy (SOURCE) log↓ | (Active box=BPC src=SCFNHSB dst=MCC7) | ↓log (DEST) phy↓ |
|---|---|---|

BPC

| 001 SCFNHSB | 001 | b◄ | | 001 | MCC7 | 004 |
|---|---|---|---|---|---|---|
| | | | | 002 | | 005 |
| | | | | 003 | | 006 |
| | | | | 004 | | 007 |
| | | | | 005 | | 028 |
| | | | | 006 | | 029 |
| | | | | 007 | | 046 |

```
┌─────────────────────────────────────┐
│ "BUILD" HELP                        │
│ Use this function to create a set   │
│ of pre-selected Macros for making   │
│ future connections. A group of      │
│ connections can be made with just   │
│ a flick of a mouse button. To de-   │
│ select, pick the item again or select│
│ the UNBUILD function.               │
│                                     │
│ (LB)-select (MB)-commit (RB)-options│
│                          (F1 to exit)│
└─────────────────────────────────────┘
```

| 001 SCFNHSB | 001 | | 001 | MCC7 | 004 |
|---|---|---|---|---|---|
| | | | 002 | | 005 |
| | | | 003 | | 006 |
| | | | 004 | | 007 |
| | | | 005 | | 028 |
| | | | 006 | | 029 |

145↗

| CONNECT | DISCONNECT | DETAILS | RETURN |
|---|---|---|---|
| BUILD | UNBUILD | LOGGER | POLL X/Y |

Message: Please make a selection

UNCLASSIFIED

FIG. 9

| MATRIX | Data Routing Group control: | | | Free RAM: 335592 |
|---|---|---|---|---|
| 0031 | 23:47:00.87 | 02/20 | ALRM: Drg err: op= | |
| 0032 | 23:47:00.87 | 02/20 | ALRM: No return response for "Connect" | |
| 0033 | 23:47:00.87 | 02/20 | (Connect select) Source: SCFVTSB | phy: 011 log: 003 |
| | | | Destination: MCC9 | phy: 092 log: 006 |
| 0034 | 23:47:02.58 | 02/20 | ALRM: Unknown Error occured | |
| 0035 | 23:47:02.63 | 02/20 | ALRM: Drg err: op= | |
| 0036 | 23:47:02.63 | 02/20 | ALRM: No return response for "Connect" | |
| | | | Destination: MCC9 | phy: 044 log: 001 |
| | 23:47:02.69 | 02/20 | Connect select complete | |
| 0037 | 23:47:09.50 | 02/20 | BUILD for SCFNHSA   Box: BTL | phy: 002 log: 003 |
| | | | | phy: 040 log: 001 |
| 0038 | 23:47:20.59 | 02/20 | BUILD for SCFVTSB   Box: BUS | phy: 003 log: 001 |
| | | | Destination: MCC7 | phy: 027 log: 006 |
| 0039 | 23:50:55.41 | 02/20 | BUILD for SCFVTSB   Box: BPC | phy: 003 log: 001 |
| | | | Destination: MCC9 | phy: 003 log: 004 |
| 0040 | 23:51:02.88 | 02/20 | BUILD for SCFNHSA   Box: BPC | phy: 000 log: 001 |
| | | | Destination: MCC7 | phy: 006 log: 003 |

| CONNECT | DISCONNECT | DETAILS | RETURN |
|---|---|---|---|
| BUILD | UNBUILD | LOGGER | POLL X/Y |
| Message: | | | |

========== UNCLASSIFIED ==========

FIG. 10

SYSTEM AND METHOD FOR CONTROLLING A MULTI-POINT MATRIX SWITCH

TECHNICAL FIELD

This invention relates to user-controlled interactive computer display systems, and more particularly to a system and method for controlling a multi-point matrix switch.

BACKGROUND ART

Multi-point matrix switches are employed for routing signal traffic to and from multiple sources and destinations in communication systems. These switches are employed, in particular, in satellite communication systems, where tens of thousands of individual switch connections may be controlled separately to route telemetry, command, and status data to and from satellites and land-based systems.

Presently, mainframe computer systems are used to control each switch point in the matrix switch. This approach, used by the U.S. Air Force for satellite communication, involves certain classified information; nonetheless, this approach is described generally as prior art herein to the extent it does not breach national security.

One of the problems in using the present approach for controlling multi-point matrix switches is its poor man-machine interface. The mainframe computers must be programmed initially by several operators to enter signal path information. The formatting of this information is quite complex and confusing to the operators. Each operator typically looks up source and destination information from a reference document. Logical port assignments must then be cross-referenced meticulously with physical port assignments for particular satellites and land-based systems. This methodology permits the operator to identify possible routing paths so that he or she may then key in the necessary path information. This information must be provided by the operator in precisely-defined text string formats in order to route connections successfully between various source and destination nodes in the communications network.

This approach, however, is time-consuming and prone to operator error, since the operator is required to perform manually many complex steps. Moreover, this approach of using mainframe computers is expensive, necessitating not just costly hardware but also significant manpower support for system maintenance. There is a need, therefore, for a system and method of controlling matrix switches that are easier and less expensive to use.

DISCLOSURE OF INVENTION

The present invention is a system and method for controlling a multi-point matrix switch (13) to route signals in a communication system (11). The invention identifies source and destination ports (129, 133) in the communication system (11) and then polls identified ports (129, 133) to recognize those that are available for communication. Identified and recognized ports (129, 133) are displayed graphically so that at least one path (139) between recognized source ports (129, 133) and associated recognized destination ports (129, 133) may be selected graphically by user (159) input. Selected path (139) information is then submitted to switch (13) to cause switch (13) to route signals through the selected paths (139) by connecting recognized source ports (129, 133) to associated recognized destination ports (129, 133).

BRIEF DESCRIPTION OF THE DRAWINGS

FIG. 4 is a graphic representation of a display (183) for source (19) and destination (21) selection.

FIG. 5 is a graphic representation of a parameters-setting window (125) superimposed over the source and destination selection display (183).

FIG. 6 is a graphic representation of a global polling window (127) superimposed over the source and destination selection display (183).

FIG. 9 is a graphic representation of a help window (145) superimposed over the vector assignment scroll area of FIG. 7.

FIG. 10 is a graphic representation of a display for a log scrolling area (195).

BEST MODE FOR CARRYING OUT THE INVENTION

Figure 1:
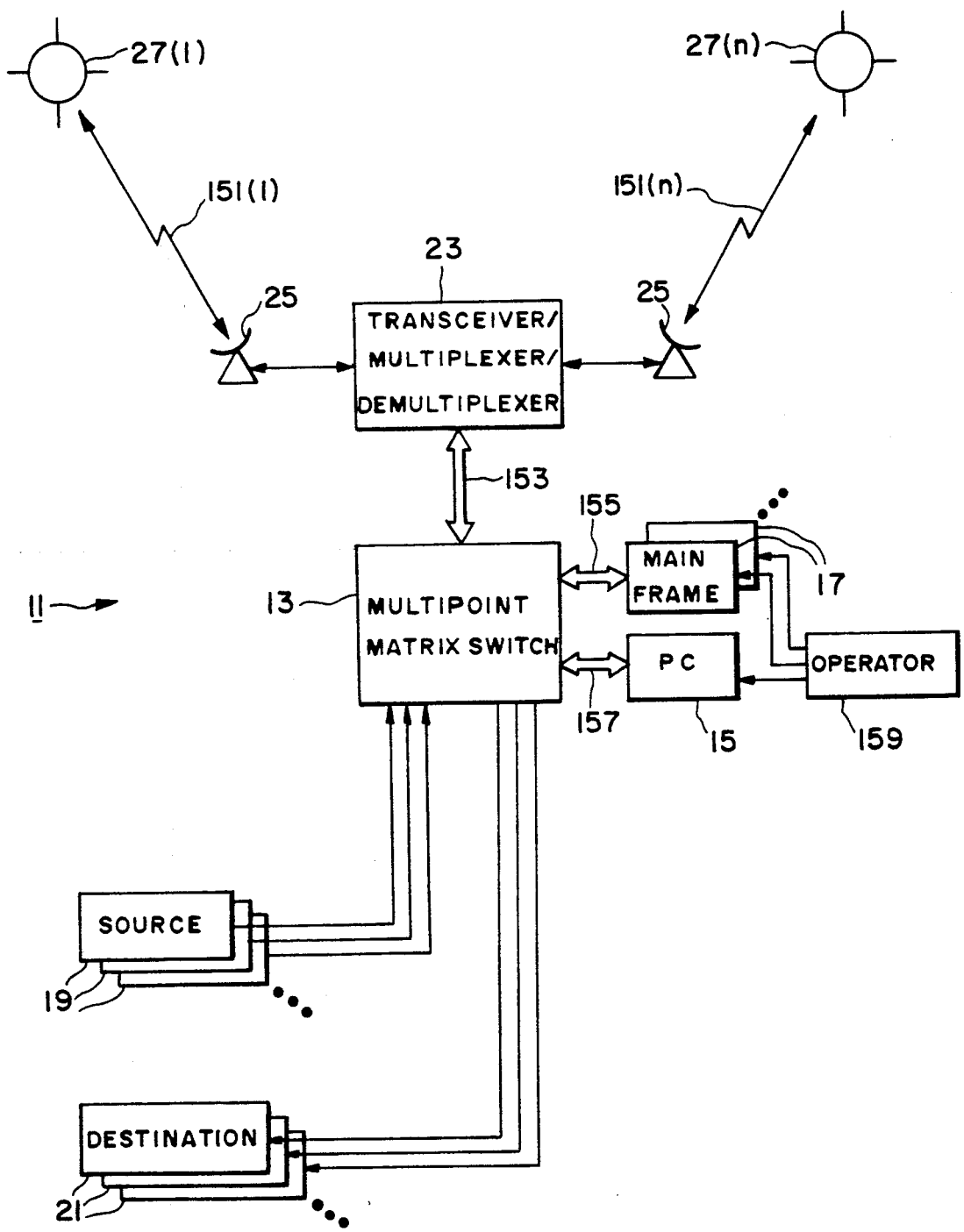
FIG. 1 is a satellite communication system (11) employing a multi-point matrix switch (13).

Referring now to FIG. 1, a communication system, in general, is shown having a network of nodes which communicate with each other; in this particular case, what is shown is a satellite communication system 11, where satellites 27 communicate with sources 19 and destinations 21 communicate with a family of satellites 27. In many cases, some satellites 27 may function as sources 19 or destinations 21, whereupon means are provided onboard satellite 27 for originating or receiving data. Typically, information such as command, status, and telemetry are communicated over this system 11. For example, several sources 19 may send command information to satellite 27, and satellite 27 then returns status or telemetry information to several destinations 21. In order for satellite 27 to communicate with land-based systems, e.g. sources 19 and destinations 21, antennae 25 are employed respectively, for receiving and transmitting signals to and from satellite 27. In some cases, source 19 may send requests along with signal information to request transmission to particular destinations 21.

Transceiver 23 is coupled to antennae 25. In many applications, a multiplexer and a de-multiplexer are also coupled to transceiver 23 to multiplex and demultiplex signals when appropriate for transmitting or receiving. Transceiver 23 may function as source 19 or destination 21 in most cases. A multi-point matrix switch 13 is shown coupled to sources 19 and destinations 21. This type of switch, to the extent it may be discussed herein, is arranged as a matrix of switch points defined by the intersection of rows and columns of input and output signal lines respectively. Thus, by engaging multiple switch points on a given input signal line, the given input signal may be routed to several output lines. In the present embodiment, switch 13 contains 45,000 possible switch points. Although switch 13 is configured to route signals from sources 19 to destinations 21, switch 13 is equipped to route signals as well in the opposite direction, e.g., destination-to-source. Uplink satellite signals 151 are transferred from sources 19 to satellite 27 via switch 13, and downlink signals 151 are transferred from satellites 27 coupled to destinations 21 via switch 13. Moreover, switch 13 is coupled to transceiver/multiplexer/demultiplexer 23 over what are shown to be redundant channels 153 for primary and backup signal transmission and reception.

Similarly, switch 13 is coupled over redundant channels 155, 157, respectively, to at least one mainframe computer 17 and to a personal computer (PC) 15. Typically, system 11 employs several mainframes 17 for overall system redundancy. As discussed later herein, the invention resides at least partly in coupling PC 15 to switch 13 in lieu of mainframes 17 coupling to switch 13, insofar as PC 15 provides graphical displays which assist an operator 159 to build and connect signal routing paths. Thus, aside from PC 15 shown in FIG. 1 and its redundant connections 157 to switch 13, the other items illustrated in FIG. 1 depict the satellite communication system 11 presently employed by the U.S. Government.

Figure 2:
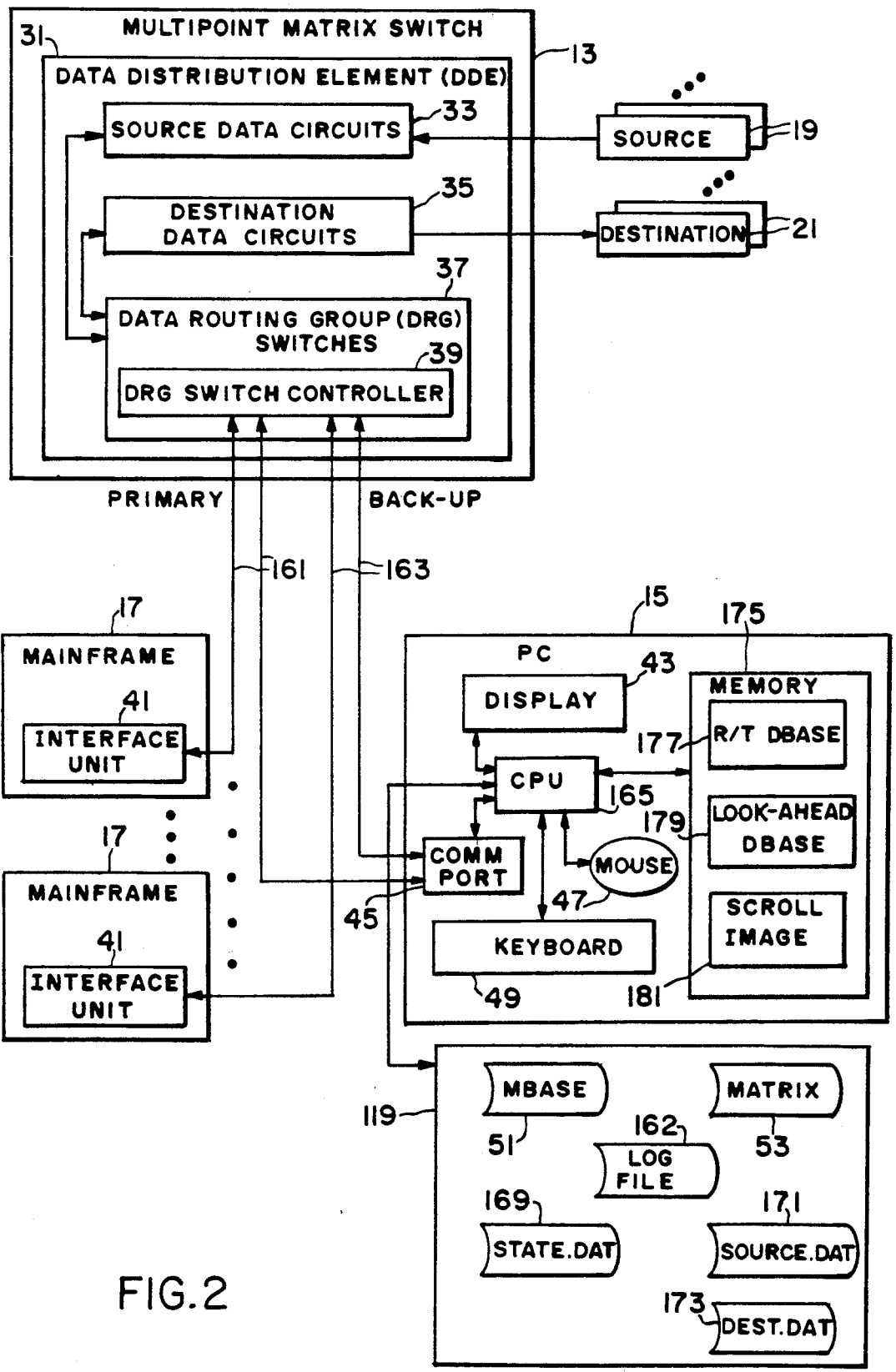
FIG. 2 is a block diagram of relevant portions of the multi-point matrix switch (13), mainframe computers (17), and the PC system (15) shown in FIG. 1.

In FIG. 2, a block diagram of the relevant portions of switch 13, mainframes 17, and PC 15 are illustrated. It is the intent in the present invention that PC 15 replace and substantially improve upon the switch-controlling functions of mainframes 17 particularly with regard to signal routing.

A Data Distribution Element (DDE) 31, included within switch 13, allows switch 13 to accomplish routing at very high traffic rates and switching speeds. Included within DDE 31 are source data circuits 33 and destination data circuits 35 for transferring signal data to and from sources 19 and destinations 21 to which circuits 33, 35 are coupled respectively.

Also included in DDE 31 are Data Routing Group (DRG) switches 37. DRG switches 37, coupled to circuits 33, 35, function to receive signals from an external control source to enable switch 13 to route signals responsively. In particular, DRG switches 37 contain a DRG switch controller 39 for communicating with the external control source through standard communication ports, not shown here. For system signal redundancy, the DRG switch controller 39 includes ports for primary and back-up connections 161, 163.

Each mainframe 17 comprises an interface unit 41 for communicating with DRG switches 37 such that mainframes 17 function as external control sources to switch 13.

In accordance with the present invention, PC 15 functions as an improved external control source to switch 13, submitting selected signal path information thereto. PC 15 may be coupled to DRG switch controller 39 over redundant primary and backup channels 161, 163. Channels 161, 163 are configured preferably to be RS232-compatible. Thus, PC 15 communicates with DRG switch controller 39 through an RS232 communication port 45 within PC 15. PC 15 may be embodied as any one of several standard IBM-compatible personal computer systems. Accordingly, PC 15 includes CPU 165, memory 175, and graphics display 43 coupled to CPU 165. Memory 175 comprises Real Time (R/T) database 177, Look-Ahead database 179, and scroll image 181. Display 43 displays graphically source and destination selections 121, 123, shown subsequently in FIG. 4 to 9, along with related status information to operator 159. Moreover, PC 15 comprises input devices, such as keyboard 49, which typically includes function keys not shown here, and mouse 47. These input devices 49, 47, also coupled to CPU 165, permit the operator 159 to select graphically at least one path between displayed source and destination selections 121, 123. Also shown in FIG. 2 is disk 119, coupled to CPU 165, containing software routines, (typically .EXE programs in the MS-DOS operating system environment), MBASE 51 and MATRIX 53, which are executable on PC 15. Disk 119 may also contain, when generated subsequently as described herein, log file 162, STATE.DAT 169, SOURCE.DAT 171, and DEST.DAT 173. Disk 119 may be included in PC 15 or coupled externally thereto as a remote storage system.

Figure 3:
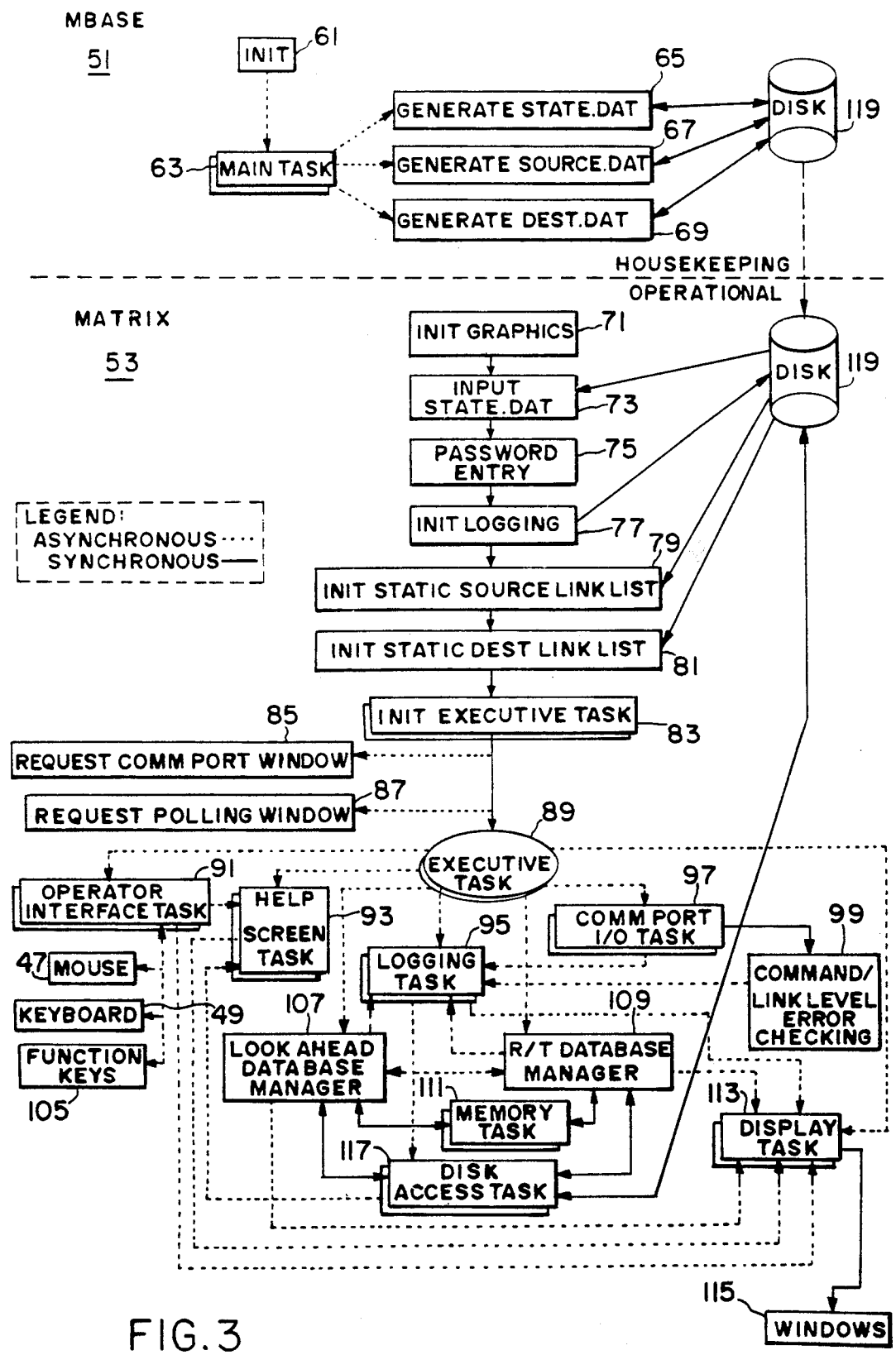
FIG. 3 is a block diagram showing the logical flow for controlling the multi-point matrix switch (13).

In FIG. 3, MBASE 51 and MATRIX 53 are described in greater detail by a block diagram showing their logical flow. Routines 51, 53 run on PC 15 to control switch 13 by pre-configuring and submitting signal path information thereto. MATRIX 53 serves as the main switch 13 control program, while MBASE 51 functions as the supporting database program for MATRIX 53. Together with PC 15, MBASE 51 and MATRIX 53 comprise the control system of the present invention and function as the improved external control source to switch 13.

INIT 61 is shown as the entry point for MBASE 51. INIT 61 opens files, starts keyboard 49 and mouse 47 drivers, and sets display screen 43 and selection menus.

After MBASE 51 executes INIT 61, it then executes main task 63 to generate three .DAT files: STATE.DAT 169, SOURCE.DAT 171, and DEST.DAT 173, as shown respectively, at blocks 65, 67, and 69. These files serve to provide static steering parameters, preferably configured as link lists.

In general, task 63 functions as a major executing node for managing subfunctions to complete complex jobs. In this case, task 63 generates STATE.DAT 169 to create system default parameters, such as maximum fan-out, maximum fan-in, maximum bytes in log, and password information, as well as other parameters. Maximum fan-in and fan-out parameters define the number of signal connections that may be routed respectively to destinations 21 or from sources 19. Maximum bytes specifies the size limit of text files containing logging information, if invoked; and permissible user passwords are included in STATE.DAT 65.

By generating SOURCE.DAT 171, task 67 adds, modifies, and deletes source 19 names used in MATRIX 53. In comparison, by generating DEST.DAT 173, task 69 adds, modifies, and deletes destination 21 selections. Accordingly, blocks 65 and 67 for generating SOURCE.DAT 171 and DEST.DAT 173 function to identify sources 19 and destinations 21 in communication system 11. Each of blocks 65, 67, and 69 are so-called "queued" routines, because they are woken-up by a caller to perform duties while the caller continues on its way, thereby permitting concurrent functioning by CPU 165.

While MBASE 51 serves to perform housekeeping functions, MATRIX 53 accomplishes operational functions. The entry point for MATRIX 53 is INIT Graphics 71, where the graphics mode is set. From that point, MATRIX 53 performs Input STATE.DAT 73 to obtain state data from disk 119 that has been set by routine 65 for purposes of determining system limit checks and initialization. Step 73 is a so-called "serial" routine because, when entered, it completes its function without being accessed again. Routines may be both queued and serial.

The next step, Password Entry 75, is a serial routine for querying operator 159. Step 75 ensures that password entries match passwords stored in STATE.DAT 169. After Password Entry 75, INIT Logging 77, another serial routine, opens log file 162 and sets up initial parameters for logging task 95, described herein.

The next step is INIT Static Source Link Lists 79, also a serial routine, which reads in SOURCE.DAT 171 and creates a link list head for each valid source 19 selection included in SOURCE.DAT 171. INIT Static Dest Link List 81, another serial routine, is the next step. This step 81 reads DEST.DAT 173 and creates a link list head for each valid destination 21 selection included in DEST.DAT 173.

Most of the previous, and some subsequent, steps in MATRIX 53 and MBASE 51 read or write data to disk 119 synchronously as indicated by solid arrows defined by the legend in FIG. 3; dotted arrows, in comparison, depict asynchronous links in the program flow.

After MATRIX 53 performs INIT Static Dest Link List 81, it performs INIT Executive task 83, a serial routine, to set initialization variables for the main routines called by Executive Task 89. From task 83, MATRIX 53 may proceed to Executive Task 89, a major executing node for managing subfunctions, or to routines 85 and 87, both queued routines.

Routine 85 is a Request Communication Port Window for queuing up requests for such a window at completion of initialization, e.g., steps 71, 73, 75, 77, 79, 71 and 83. The execution of routine 85 coaxes operator 159 to establish the RS232 port connection to DRG 37. Routine 87 is a Request Polling Window for queuing up requests for such a window at completion of initialization and coaxes operator 159 to request DRG 37 to send its current switch 13 configuration to circuits 33, 35. Routine 87 permits Real Time (R/T) Database Manager 109 to create an image, R/T database 177, of system 11 configuration in memory 175, thereby recognizing those sources 19 and destinations 21 available for communication.

Executive Task 89 is the central contact task from which all main functions are activated. One such function is Operator Interface Task 91, a queued task for collecting inputs from operator 159 for various activities. For example, task 91 collects input from mouse intercept 101, another queued routine, which gathers mouse 47 movements and button presses. Keyboard intercept 103, also a queued routine, receives and buffers keyboard 49 entries. Similarly, function key intercept 105, also a queued routine, receives and decodes special function key entries.

Executive Task 89 is also connected to Help Screen Task 93, a queued task, for assisting operator 159 to determine current environment status of system 11. Task 89 queues up for display appropriate Help Window 145, as shown in FIG. 9, and obtains environment information from Operator Interface Task 91 and Disk Access Task 117, discussed later.

Executive Task 89 also activates a Logging Task 95, a queued task, for receiving messages from various other tasks and formatting texts, time date tags, and writes to disk 119. Executive Task 89 also activates a Comm Port I/O Task 97, a queued task, for accepting requests from R/T Database Manager 109 to transmit DRG 37 commands to default switch controller 39, as well as to configure and reconfigure link level parameters in files 169, 171, 173.

Task 97 furthermore accepts asynchronous interrupts from the RS232 hardware connected to DRG switch controller 39 and listens for responses from DRG 37 following transmissions by operator 159 of commands via task 91. Moreover, task 97 may call Command/Link Level Error Checking 99 for input error-checking to sample received DRG 37 status frames for valid content, size, and range, and then establish the appropriate returned response to display 43 and log file 162.

Executive Task 89 also activates Look-Ahead Database Manager 107, a queued routine. Routine 107 accepts requests from Operator Input Task 91 and builds an image, Look-Ahead database 179, of the selected requests in memory 175. These requests are then checked against a list of rules, stored preferably in STATE.DAT 169, that govern Look-Ahead database 179. Thus, by permitting operator 159 to pre-configure future path connections, which are verified by PC 15 as acceptable to switch 13, routine 107 ascertains that signal routing is accomplished easily and cost-effectively. Look-Ahead Database Manager 107 has disk level file access through Disk Access Task 117, a queued routine.

Executive Task 89 also activates R/T Database Manager 109, a queued task. R/T Database Manager 109 accepts requests from Comm Port Task 97, builds memory images, R/T database 177, of system 11 configuration retrieved by routine 85, and accepts requests from operator 159 and Look-Ahead Database Manager 107 for release of switch 13 commands to Comm Port Task 97. R/T Database Manager 109 also has disk level file access to disk 119 through Disk Access Task 117.

Both Look-Ahead and R/T Database Managers 107, 109 are coupled to queue logging interfaces at Logging Task 95. Memory Task 111, a queued task, is coupled synchronously to database managers 107, 109 for controlling all memory 175 accesses to optimize space control in databases 177, 179.

Display Task 113, a queued task, accepts pointers to scroll memory image 181 for viewing Look-Ahead and R/T Memory images 177, 179. Task 113 operates in synchronization with Operator Interface Task 91 for screen option selection and system configuration display. Task 113 receives information from several different tasks over asynchronous connections, as shown in FIG. 3. Task 113 is coupled to Windows 115 for providing representations of graphic screens in display 43, illustrated subsequently in FIGS. 4 through 10. Typically, task 113 provides operator 159 with interactive computer display 43 to identify sources 19 and destinations 21, poll for availability, select routing paths for connection, verify selections, and submit selections to switch 13 for signal routing.

When the improved external control source operates to control switch 13, e.g., when MBASE 51 and MATRIX 53 .EXE files execute on PC 15, operator 159 typically uses one or more screens 183, 185, 187, 189, 191, 193, and 195, shown in FIGS. 4 through 10, to assist him or her in performing signal routing through switch 13. Each of these screens are formatted similarly with a "Matrix Data Routing Group control" heading, including "Free RAM size" information, on top of each screen, as represented in display 43. The bottom of each screen typically contains a message for operator 159, as well as an indication of whether the screen contains classified or unclassified information.

FIG. 4 illustrates screen 183 showing high-level source 19 and destination 21 selections. Source 19 selections are listed and itemized in columns on the left side under a source list 121, and destination selections are listed in columns on the right side under a destination list 123. Of course, source 19 and destination 21 locations on the screen may be arranged differently as long as selection lists 121, 123 are organized collectively for easy graphical presentation and user-selection.

Usually, source list 121 contains satellite nodes, in this case, SCFNHSA as the first option. The "c" flag adjacent to this option identifies source 19 as being connected and therefore unavailable for a new connection at this time. Under destination list 123, destinations 121 are provided typically indicating various land-based nodes in the satellite communication network 11. Land-based nodes might include computer systems, laboratories, and other command, control, and status (CCS) systems. Destinations 21 are identified similarly with a "c" flag when appropriate.

FIG. 5 illustrates window 125 superimposed over screen 185 shown in FIG. 4. Window 125 is a DRG communications and general operation parameters-setting window. Window 125 lists various user-definable parameters, starting with a parameter called Active DRG, for defining DRG switch controller 39 to be used. The next two parameters, DRG 1 comm port and DRG 2 comm port allow operator 159 to specify the appropriate DRG comm port, e.g. primary or backup, to be coupled to an external control source, such as PC 15 or mainframes 17.

The next DRG parameter, called DRG Timeout, allows operator 159 to specify, in milliseconds, timeout information useful for handshaking. This parameter optimizes the interface to CPU 165 controlling DRG 37 interface, in this case a Z80 microprocessor.

In/Out Latency is the next DRG parameter listed in window 125 for specifying, in milliseconds, the wait time between command retransmissions to switch 13. This parameter is tuneable by resending commands.

The next DRG parameter is called Maximum Errors. This parameter may need to be set higher for certain directives routed through switch 13. The Retries DRG parameter specifies the number of attempts automatically-invoked when resending a command to switch 13. The Clock Mode parameter allows the user to specify "C" for clock when an external clock signal (not shown) is used to synchronize data transmission, or "B" for bypass, when data are sent asynchronously, independently of the clock.

The last DRG parameter is Zone 3 Format, which allows operator 159 to use a high-level macro by entering "M" for merged. This particular entry is appropriate when sending command and status simultaneously. Normally, each one the DRG parameters has been pre-set to a default value. Moreover, window 126 indicates to operator 159 the availability of function keys for invoking system utilities, such as F1 for Help and F6 for Self Test.

During the course of operating the satellite communication system 11, different categories of information are routed through switch 13. These categories may include, for instance, command, status, telemetry and system time, or clock, information. Additional categories may be primary or back-up, whereupon primary information is typically sent through high-bandwidth channels, while back-up information may be sent through low-bandwidth channels, which offer potentially lower signal transmission quality. Sometimes signals may be classified and called "red" signals, or unclassified and called "black" signals. System 11 is configured to deal with each of these different categories of signals or information. In this regard, FIG. 6 shows a Global Polling Window 127 superimposed on screen 187, which allows operator 159 to "poll", or determine which destinations 21 and sources 19 are available for receiving or transmitting data pursuant to the listed categories of information, such as Black Primary Command (BPC), Black Primary Status (BPS), Back-Up Command (BUC), Back-Up Status (BUS), Black Telemetry (BTL), and Irig B (system time). In addition to categorizing different information types, the present invention is configured to distinguish between different signal types, e.g., digital/analog, TTL/MOS, etc.

Figure 7:
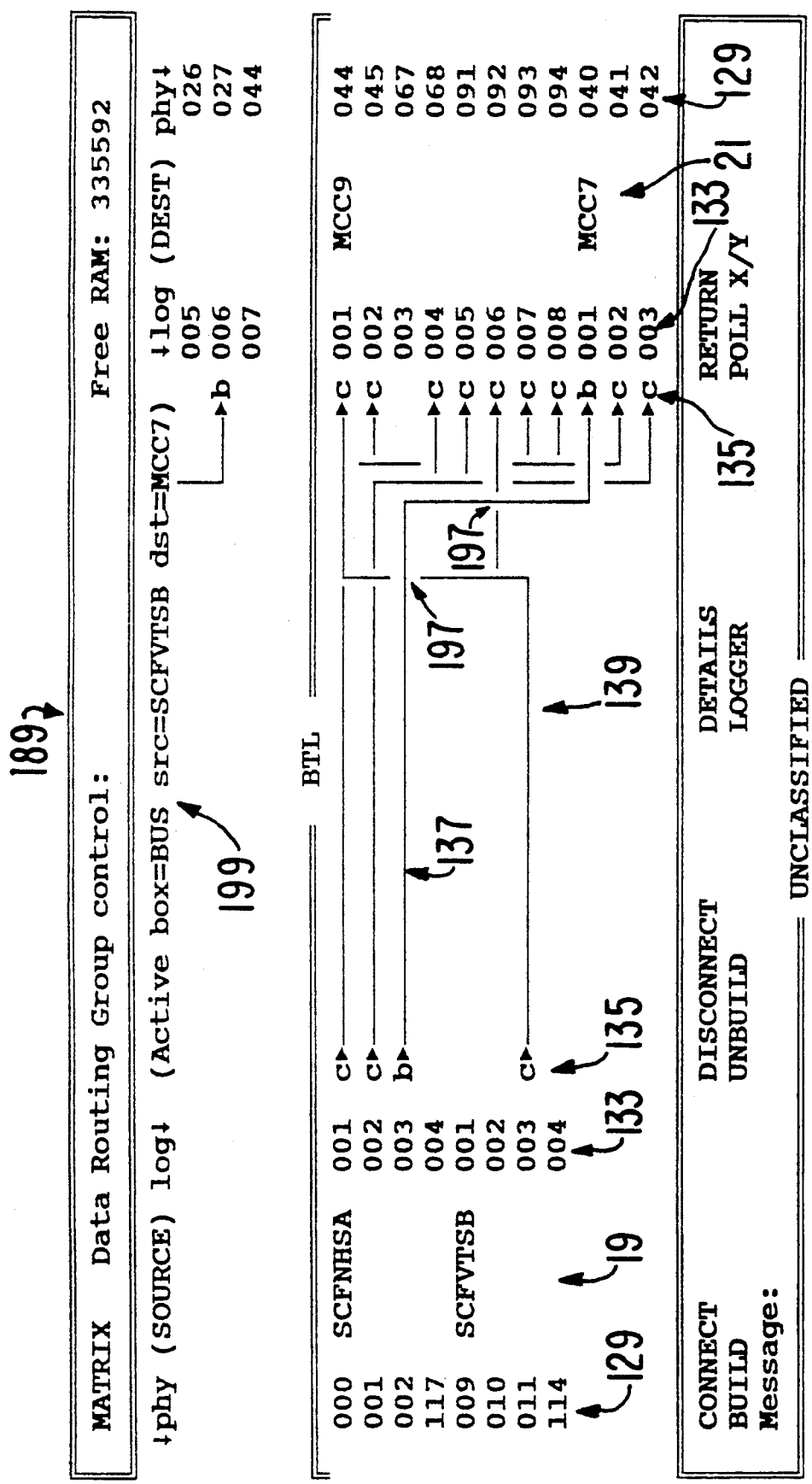
FIG. 7 is a graphic representation of a display (189) for a scroll area for build and connect vector assignment.

FIG. 7 illustrates scroll area screen 189 for assigning "build" and "connect" vectors. Vectors graphically represent signal paths between sources 19 and destinations 21. "Build" vectors represent future paths preconfigured by Look-Ahead Database Manager 107. "Connect" vectors represent active switch 13 paths that are currently routing signals, as configured in R/T Database Manager 109.

Here, black telemetry type information is routed, as indicated by the "BTL" heading. Screen 189 shows physical ports 129 with corresponding logical ports 133 on both sides of screen 189. In general, each source 19 or destination 21 has at least one physical port 129 assigned to it to identify uniquely to switch 13 actual points for signal reception or transmission. Moreover, each source 19 or destination 21 has logical port 133 corresponding to each physical port 129; however, logical ports 133 are only assigned uniquely within each source 19 or destination 21. Thus, particular logical port 133 assignments may be duplicated among different sources 19 or destinations 21. Physical and logical ports 129, 133 for sources 19 are listed on the left side of screen 189, while physical and logical ports 129, 133 for destinations 21 are listed on the right side.

Sources 19, such as SCFNHSA, are similarly listed on the left side, while destinations 21, such as MCC9, are listed on the right side. It is particularly useful to operator 159 to have physical and logical ports 129, 133 aligned appropriately against sources 19 and destinations 21 in a graphical and easy-to-read format. Screen 189 is scrollable to permit operator 189 to view more source 19 and destination 21 selections from different information categories.

Moreover, flags 135 are provided, including a "c" flag for "connect" and "b" flag for "build". The "c" flag indicates to operator 159 which ports 133, 129 are coupled through which signals are actually being transmitted. The "b" flag indicates to operator 159 which paths between sources 19 and destinations 21 are not yet coupled, but are merely "built". Thus, built paths are pre-configured for future coupling and have their configurations stored in Look-Ahead Database Manager 107. An "e" flag is also provided for indicating erroneous connect or build attempts.

In accordance with an important aspect of the present invention, the lines shown connecting source ports 129, 133 to destination ports 129, 133 visually represent signal routing paths between sources 19 and destinations 21, as selected by operator 159. Operator 159 selection is accomplished interactively through input devices, e.g., keyboard 49, mouse 47, and function keys 105.

In particular, vector paths 139 are drawn hierarchically such that most recently-selected path 137, appears to be three-dimensionally above previously-selected paths. This three-dimensional orientation is accomplished by drawing path 137 as a solid line, and earlier-drawn lines are drawn with a break 197 in the path, e.g., to illustrate that a later-drawn path is laid above earlier paths. This orientation is useful for operator 159 to understand the sequence of builds and connects, as well as for debugging purposes. Moreover, paths 139 may be represented in different schema, such as patterns or colors, as defined by Display Task 113, for identifying particular paths to operator 159. Current select status 199 near the top of screen 189 provides operator 159 with dynamic information, including active category or "box," and the most recently selected source and destination in the active box.

Figure 8:
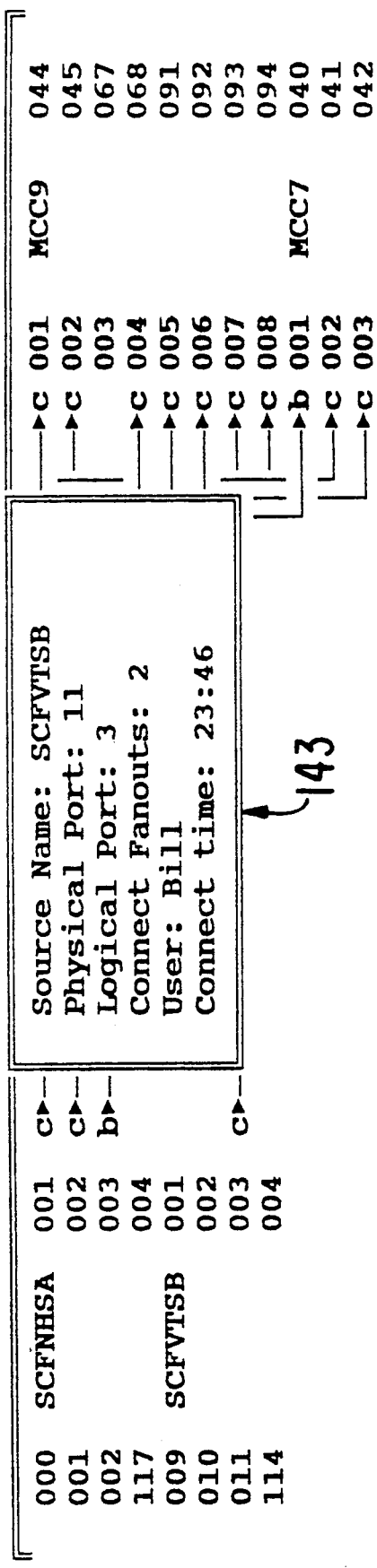
FIG. 8 is a graphic representation of a detail information window (143) superimposed over the vector assignment scroll area of FIG. 7.

In FIG. 8, screen 191 shows a window 143 superimposed over screen 187 of FIG. 7. Window 143 provides operator 159 with detailed information about particular paths. In FIG. 9, screen 193 shows Help Window 145 providing operator 159 with context-sensitive help messages.

FIG. 10 shows screen 195 displaying a typical output report from log file 162. Screen 195 is scrollable and typically lists a number of successful and unsuccessful attempts at building and connecting signal routing paths 139.

The above description is included to illustrate the operation of the preferred embodiments and is not meant to limit the scope of the invention. The scope of the invention is to be delimited only by the following claims. From the above discussion, many variations will be apparent to one skilled in the art that would yet be encompassed by the true spirit and scope of the invention.

What is claimed is:

1. A system for controlling a multi-point matrix switch that routes signals in a communication network, said system comprising:
   means for identifying source and destination ports in the communication network, said identifying means and said ports coupled to the switch;
   means for polling identified ports to recognize those ports that are available for communication, said polling means coupled to the identifying means;
   means for graphically displaying identified ports, said displaying means coupled to the polling means;
   means for graphically selecting at least one path between recognized source ports and associated recognized destination ports, said selecting means coupled to the displaying means; and
   means for submitting selected path information to the switch, said submitting means coupled to the selecting means and to the switch, for causing the switch to route signals through the selected paths by connecting selected source ports to associated selected destination ports.

2. The control system in claim 1, wherein the selecting means comprises, coupled to the displaying means, means for verifying input supplied by a user, so that the verified user input is selectable by the selecting means.

3. The control system in claim 2, wherein the user input is verified when the input complies with a predefined time-out parameter.

4. The control system in claim 2, wherein the user input is verified when the input complies with a predefined latency parameter.

5. The control system in claim 2, wherein the user input is verified when the input complies with a predefined maximum error count parameter.

6. The control system in claim 2, wherein the user input is verified when the input complies with a predefined retry count parameter.

7. The control system in claim 2, wherein the selecting means further comprises means for logging user input for indicating the occurrence of erroneous input, said logging means coupled to the verifying means.

8. The control system in claim 7, wherein the connections are displayed hierarchically, such that the connections for more-recently selected paths are displayed to appear three-dimensionally above earlier-selected paths.

9. The control system in claim 8, wherein the primary and back-up channels are RS232-compatible communications interfaces.

10. The control system in claim 1, wherein the displaying means displays the identified ports collectively such that the identified destination ports are sufficiently separated from the identified source ports, so that when the selecting means selects a path therebetween, the displaying means displays visible connections representing the signal path between the recognized source ports and the associated recognized destination ports.

11. The control system is claim 10, wherein the most-recently selected path is displayed as a continuously-drawn segment over previously-selected paths having discontinuously drawn segments, such that segment breaks appear in the drawn paths of earlier-selected paths over where more-recently selected paths are superimposed.

12. The control system in claim 10, wherein the displaying means displays the visible connections using different schema to identify particular paths.

13. The control system in claim 1, wherein the submitting means submits the information redundantly to the switch over a primary channel and a back-up channel.

14. The control system in claim 1, wherein the displaying means comprises context-sensitive help messages for assisting users.

15. The control system in claim 1, wherein the displaying means displays a build flag adjacent to each displayed port which has been selected but not connected by the switch to another port.

16. The control system in claim 1, wherein the displaying means displays a connect flag adjacent to each displayed port which has been connected by the switch to another port.

17. The control system is claim 1, wherein the displaying means further displays recognized ports.

18. A computer-implemented process for controlling a multi-point matrix switch that routes signals in a communication system, said process comprising the steps of:
   identifying source ports and destination ports in the communication system;
   polling identified ports to recognize those ports that are available for communication;
   graphically displaying identified ports;
   graphically selecting at least one path between recognized source ports and associated recognized destination ports, responsive to user input; and
   submitting selected path information to the switch for causing the switch to route signals through the selected paths by connecting selected source ports to associated selected destination ports.

19. The computer-implemented process in claim 18, further comprising the step of:
graphically displaying the identified ports collectively such that the identified destination ports are sufficiently separated from the identified source ports, such that when a path is selected therebetween, visible connections are displayed representing the signal path between the identified source ports and the associated identified destination ports.

20. The computer-implemented process in claim 18, further comprising the step of:
displaying hierarchically the selected paths, such that more-recently selected paths are displayed to appear three-dimensionally above earlier-selected paths.

21. The computer-implemented process in claim 18, further comprising the step of:
graphically displaying recognized ports.

* * * * *